(12) United States Patent
Blumenthal et al.

(10) Patent No.: US 8,011,880 B2
(45) Date of Patent: Sep. 6, 2011

(54) COATING FOR GAS BEARING

(75) Inventors: Roland Blumenthal, Erftstadt (DE); Michael Froitzheim, Dormagen (DE)

(73) Assignee: Oerliken Leybold Vacuum GmbH, Cologne (DE)

( * ) Notice: Subject to any disclaimer, the term of this patent is extended or adjusted under 35 U.S.C. 154(b) by 545 days.

(21) Appl. No.: 12/298,547

(22) PCT Filed: Apr. 19, 2007

(86) PCT No.: PCT/EP2007/053811
§ 371 (c)(1),
(2), (4) Date: Nov. 14, 2008

(87) PCT Pub. No.: WO2007/125042
PCT Pub. Date: Nov. 8, 2007

(65) Prior Publication Data
US 2010/0202880 A1    Aug. 12, 2010

(30) Foreign Application Priority Data

Apr. 29, 2006  (DE) .................. 10 2006 020 102

(51) Int. Cl.
*F04D 29/056* (2006.01)
(52) U.S. Cl. .......... 415/112; 415/90; 415/111; 415/229; 310/90
(58) Field of Classification Search .................. 415/112, 415/90, 111, 229; 417/423.4; 310/90; 384/103–106, 913
See application file for complete search history.

(56) References Cited

U.S. PATENT DOCUMENTS

| | | | |
|---|---|---|---|
| 2007/0071921 A1* | 3/2007 | Coulas | 428/34.4 |
| 2007/0071992 A1* | 3/2007 | Okoroafor | 428/632 |
| 2008/0069715 A1* | 3/2008 | Coulas | 418/179 |
| 2009/0098002 A1* | 4/2009 | Coulas | 418/178 |
| 2009/0136374 A1* | 5/2009 | Tsukahara et al. | 418/178 |
| 2011/0052934 A1* | 3/2011 | Sugimoto et al. | 428/623 |

FOREIGN PATENT DOCUMENTS

| | | |
|---|---|---|
| DE | 2800597 A1 | 7/1978 |
| DE | 3439648 A1 | 5/1986 |
| DE | 3330458 A1 | 3/1987 |
| DE | 3722117 A1 | 4/1988 |
| DE | 4403340 A1 | 8/1995 |
| DE | 19725784 A1 | 2/1999 |
| DE | 19821601 C1 | 3/2000 |
| DE | 19915983 A1 | 10/2000 |
| DE | 19950463 A1 | 5/2001 |
| EP | 1024294 A | 8/2000 |
| WO | WO 94/06228 A1 | 3/1994 |
| WO | WO 02/10598 A1 | 2/2002 |
| WO | WO 02/35099 A1 | 5/2002 |

OTHER PUBLICATIONS

D. Klaffke, Verschleiß in Trockener Luft, Tribologie +Schmierungstechnik.44.Inhrgang May 1997, p. 219-224.
Klaffke, D.: "Verschleiß in trockener Luft", Tribologie und Schmierungstechnik, vol. 44., No. 7 (1997), pp. 219-224.
H. Czichos, H and Habig, K.—H: "Tribologie Handbuch, Reibung und Verschleiß", 2nd Ed. 2003, Friedr. Vieweg & Sohn Verlag, Wiesbaden, pp. 404 ff.

* cited by examiner

*Primary Examiner* — Gary F. Paumen
(74) *Attorney, Agent, or Firm* — Clements Bernard PLLC; Gregory N. Clements

(57) ABSTRACT

The invention relates to a vacuum pump in which the gas bearing is coated with a hard layer, and to a process for preparing such gas bearing of a vacuum pump.

10 Claims, 2 Drawing Sheets

COATING FOR GAS BEARING

Figure 1:
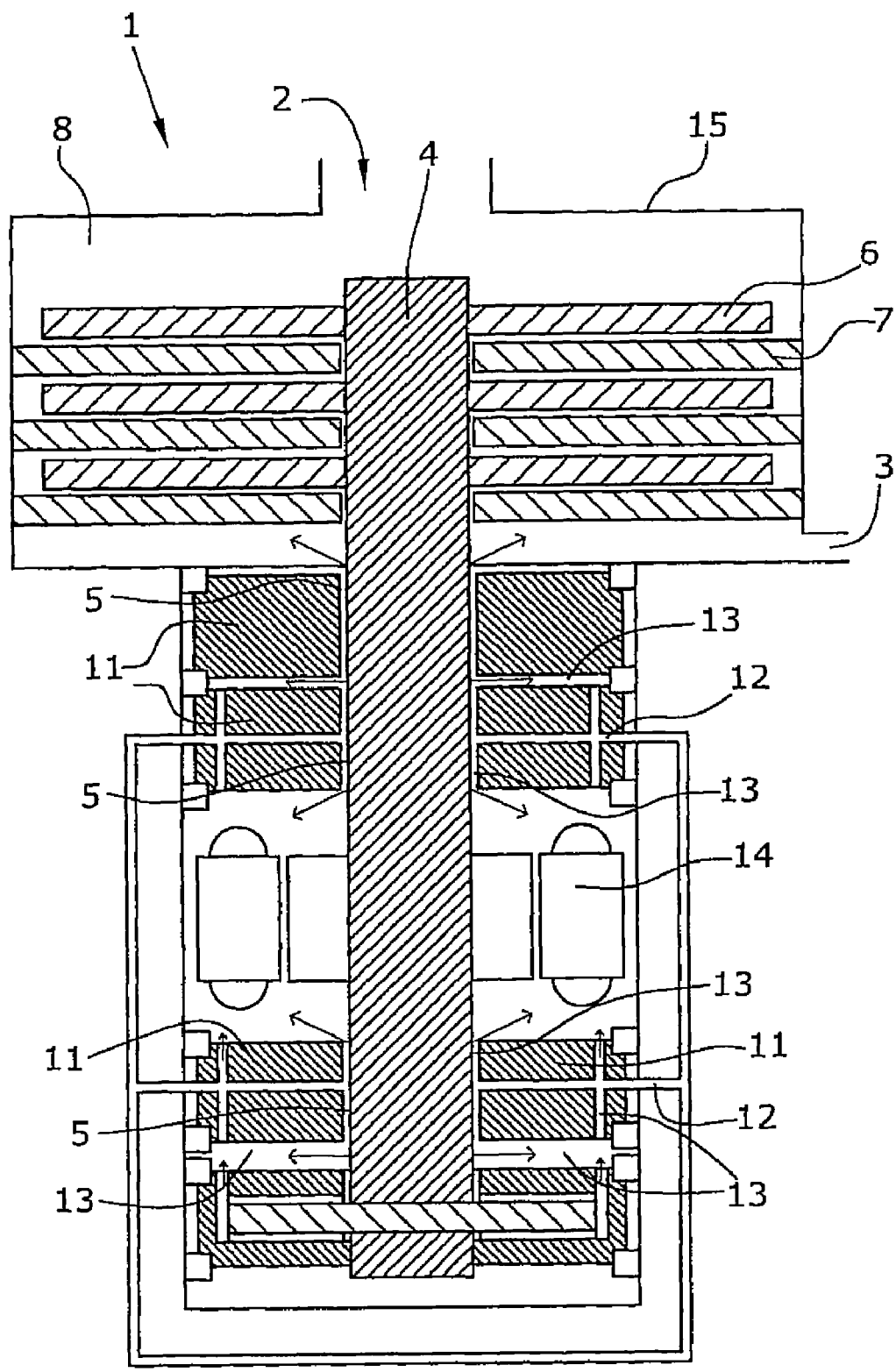

The invention relates to a vacuum pump in which the gas bearing is coated with a hard layer, and to a process for preparing such gas bearing of a vacuum pump.

When contactless and low friction gas bearings are employed in fast rotating gas conveying machines, such as turbomolecular pumps or turboradial blowers (e.g., Turbostream®), when such machines are started and stopped, there is a phase of dry friction (solid friction) between the bearing components rotating relative to one another in which the gas pressure is not sufficient to build up the required bearing force that enables a contactless operation of the bearing. Thus, depending on the constructive design, a limiting number of revolutions per minute is obtained below that dry friction occurs.

To prolong the service life of the bearing elements subject to friction, wear-resistant materials are reasonably employed for such purpose. Basically, for a particular tribological system, it is true that the wear resistance increases as the hardness increases, while the workability of such materials is made difficult. Thus, the possible wear resistance of hard materials is limited by their workability.

To date, it has been necessary to shape the hard materials employed by fine machining, such as honing or diamond machining. These operations are not only very tedious, but they also limit the hardness of the hard material employed since the working tools must always have a higher hardness.

For example, DE 34 396 48 A1 also describes the production of bearing surfaces by the packing of balls of hard material to obtain a close packing of spheres at first. Subsequently, these surfaces are compacted by rolling and then subjected to diamond machining.

Thus, the machining limits the number of hard materials that can be employed. Therefore, the desired specific tribological properties can be taken into account only in a limited way.

The particular property of tribological systems under the conditions of gas conveying machines is the fact that a water-containing adsorption layer formed under atmospheric environments can no longer be built under vacuum. Under atmospheric conditions, this water film can serve as a lubricant on the one hand and cause tribochemical reactions on the surfaces involved, which significantly influence the wearing behavior, on the other hand. Therefore, layer systems in which the atmospheric adsorption layer has a wear-reducing and thus positive effect can have a significantly lower wear resistance under vacuum or inert gas (H. Czichos, K.-H. Habig: "Tribologie Handbuch, Reibung und Verschleiß", 2nd Ed. 2003, Friedr. Vieweg & Sohn Verlag, Wiesbaden, pp. 404 ff.; D. Klaffke: "Verschleiß in trockener Luft", Tribologie und Schmierungstechnik, Vol. 44., No. 7 (1997), pp. 219-224).

On the other hand, layer systems optimized for vacuum conditions may have a lower wear resistance under atmospheric conditions.

These disadvantages that result under vacuum from the lack of a water film can affect pumps working under high vacuum, such as turbomolecular pumps, but also turboradial blowers.

The oil and fat that has been employed as lubricant in bearings of vacuum pumps has the disadvantage that it may evaporate, especially in high vacuum applications, and thus leads to an undesirable partial pressure, and lubricant can escape. The oxygen, which is otherwise present in atmospheric pump applications and is usually able to passivate the reactive surfaces is just absent in vacuum applications. Also, the water film on the surface of the shaft or rotors, which is otherwise always present in pump applications occurring under atmosphere, is missing under vacuum. Such basic conditions result in interfacial reactions of the wear partners involved that determine the wear behavior. A minimization of wear can be achieved, in principle, if the friction coefficient is minimized by tribochemically formed reaction products, if the tendency to adhesion of the interfaces is reduced, if the surface hardness is increased and/or if no tribochemical reaction occurs.

DE 199115983 A1 describes a vacuum pump with a gas bearing in which the gas bearing is not coated.

DE 19725784 A1 describes the dynamic gas bearing of a fast rotating shaft, for example, for use in a fast rotating mirror wheel as employed, for example, in scanners and printers. These are applications under atmospheric pressure.

WO 02/10598 A1 describes the dynamic gas bearing of a motor spindle, also under atmospheric pressure.

DE 19821601 C1 describes the gas bearing of a fast rotating shaft under atmospheric pressure in applications such as scanners or printers.

WO 02/35099 A1 describes a vacuum pump in which the shaft is born with ball bearings.

WO 94/6228 A1 describes a vacuum pump in which the rotor is made of a special aluminum-lithium alloy.

DE 4403340 A1 describes the coating of aerostatic bearings with hard materials by the packing and subsequent rolling of the hard materials, followed by diamond machining of the surface.

DE 19950463 B4 describes the CVD coating of gas bearings in atmospheric applications, such as shafts of hard disks. In the processes described, the coating is necessarily removed in part, so that the coating is always forcibly structured.

Thus, it is the object of the present invention to provide a gas bearing also under vacuum in which although the wear resistance can be minimized when layers of hard material are employed, the gas bearing can yet be prepared as simply as possible.

In a first embodiment, the object of the invention is achieved by a vacuum pump 1 free of lubricant and comprising an intake opening 2, an outlet opening 3, a shaft 4 carrying a gas bearing rotor 16 supported in gas bearings 5, characterized in that at least the gas bearing surface 9 facing towards the shaft 4 and/or facing towards the gas bearing rotor 16 has a hard layer 10 having a layer thickness within a range of from 0.5 to 30 µm and made of a material having a microhardness of at least 1000 HK at a measuring force of 0.01 N.

The vacuum pump 1 according to the invention advantageously has at least one intake opening 2 and at least one outlet opening 3 and at least one housing 15. Advantageously, at least one rotor 6 and at least one stator 7 form a delivery space 8 free of lubricant and flowed through by the gases to be delivered.

Vacuum pumps within the meaning of the invention are pumps for use under high vacuum covering the whole range up to pumps for use under forevacuum. The former pumps include, for example, mechanical-kinetic vacuum pumps, such as side channel compressors, turbo compressors (axial, radial), molecular pumps and turbomolecular pumps. The group of turbo compressors includes, for example, turboradial blowers, such as Turbo-Stream®.

In addition to a simplified processing, the use of low-cost substrate materials results in a saving of cost. In addition, it is possible to select coatings that can be still harder than the structural materials that can currently be used for this purpose, which may result in an extension of the service life of the components.

Due to the particularly thin design of hard layer 10 according to the invention, the structural elements in the stator elements 11 of the gas bearings 5 that may possibly be necessary can be shaped or structured, for example, by fine machining of the material of which the stator elements 11 are made, so that the surface of the hard layer 10 is nevertheless reproduced exactly by such shaping or structuring. This may be a steel or aluminum alloy, for example. Due to the low layer thickness of the hard layer, these structural elements will then be reproduced exactly with the necessary precision of about up to 1 μm despite the hard layer 10 provided on the stator elements. Therefore, advantageously, processing of the material of the hard layer 10 is not required. Therefore, in contrast to the prior art, the hard layer 10 itself need not have any additional structuring and may be essentially smooth.

The hard layer 10 of the vacuum pump 1 according to the invention is preferably essentially smooth since a cost-intensive and tedious post-processing of the hard layer 10, as in DE 4403340 A1 or DE 19950463 B4, for example, is not necessary then in contrast to the known gas bearings. Namely, in contrast to this previously known prior art, if structuring of the produced surface 9 should be desired, it can also be produced due to the fact that the underlying materials 11, such as steel or aluminum alloys, are substantially more easily processed.

Advantageously, the gas bearings 5 essentially consist of gas bearing stator elements 11, gas supply means 12 and gas outlet openings 13. The formation of the gas cushion is especially simplified thereby.

The stator elements 11 below the hard layer 10 preferably are structured to include inlet 12 and outlet channels 13 as gas supply means 12 and gas outlet openings 13.

Thus, the gas supply means 12 and gas outlet openings 13 can be integrated in the stator elements 11 particularly easily.

Advantageously, only that part of the stator elements 11 that directly faces towards the shaft 4 bears the hard layer 10. Thus, the stator elements 11 can be prepared substantially less expensively by saving hard materials.

Advantageously, the material of the hard layer 10 is selected from carbon or hard carbon compounds, especially carbides, nitrides or carbonitrides of the metals Al, W, Cr or Ti. Such layers can be realized as one-phase or more-phase layer systems up to graded layer composites.

Preferably, the layer thickness of the hard layer 10 varies by not more than 10% throughout the hard layer 10. Due to this particularly regular production of the hard layer 10, the service life of the vacuum pumps according to the invention can be clearly increased. Therefore, the $R_a$ roughness of the hard layer 10 is also advantageously up to 500 nm, especially up to 100 nm. The roughness is expressed in $R_a$ according to DIN EN ISO 4287. $R_a$ within the meaning of the invention is the mean roughness and represents the mean distance of a measuring point on the surface from the center line. Within the reference length, the center line intersects with the actual profile in such a way that the sum of the absolute values of profile deviations based on the center line is a minimum.

A mechanical post-processing of the components after coating is no longer necessary especially when the layer thickness of the hard layer 10 according to the invention is preferably within a range of from 1 to 5 μm, especially from 1 to 2.5 μm. Thus, the function-related tolerances of the gas bearing can be observed particularly easily.

In another embodiment, the object of the invention is achieved by a process for the preparation of a gas bearing of a vacuum pump according to the invention in which the hard layer 10 is applied by a coating method selected from the group consisting of PVD, CVD, electrolysis or implantation of uncharged atoms or molecules. In this case, the abbreviation PVD means physical vapor deposition and designates all vapor deposition processes in which no chemical reaction occurs on the surface. CVD designates chemical vapor depositions in which so-called precursor molecules, after having been vapor-deposited on the surface, react to form particular compounds.

These are methods that deposit wear-protection layers 10 physically (PVD) or chemically (CVD) from the gas phase onto the substrate material 11. It is particularly advantageous if a plasma-supported PVD or CVD process is employed as the coating method. These methods are supported by igniting a plasma, which results in a decrease of the process temperature, among others. This is advantageous, in particular, when thermally sensitive substrate materials 11 are employed for coating. However, the coatings 10 may also be applied, for example, by implanting uncharged atoms or molecules (for example, Dichronites®) if these enable sliding ideally without adhesion or abrasion under vacuum or inert dry gases.

Before the coating operation, the surface 9 is advantageously etched with ions in a particular process step, especially with argon ions to thus achieve a particularly high adhesive strength of the applied hard layer 10.

FIG. 1 shows a cross-sectional view of a vacuum pump 1 according to the invention for the example of a turbomolecular pump.

Figure 2:
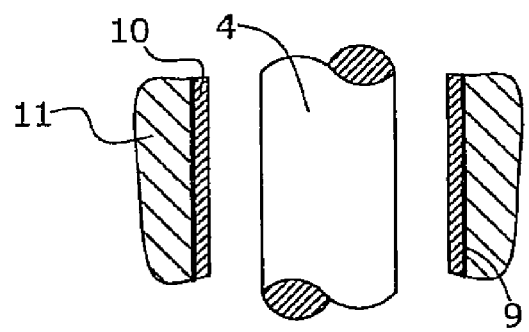

FIG. 2 shows as an enlarged detail the hard layer 10 on the surface 9 of the stators 11 with the shaft 4 enclosed by the hard layer 10.

Figure 3:
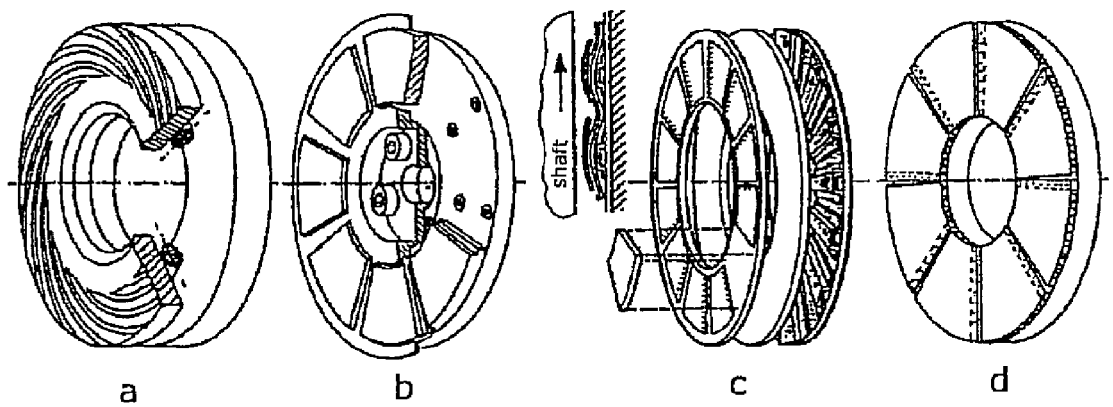

FIG. 3 shows different embodiments of the stators 11 (a: spiral groove design, b: tilting segment design, c: Garrett design, d: MTI design).

In the following, the invention is illustrated by means of a concrete example, but wherein the subject matter of the invention is not limited thereto:

The gas bearing 5 or the gas bearing component may be a spherically symmetrical disk of an axial gas bearing with concentrically arranged and spirally running gas channels (cf. FIG. 3 a). The component was made of an alloyed steel. In order to ensure the operability of the axial bearing component, its upper side as well as that of the corresponding counter-disk had to be polished. The surface 9 of this component was coated with a PVD hard material layer 10 as sold, for example, under the trade name BALINIT® by Balzers Verschleißschutz GmbH of Bingen. During the start-up into the operational state and the braking down from the operational state, the two bearing disks were in contact, which resulted in sliding friction. In order to achieve a coating 10 having a high adhesive strength, the component surface 9 was subjected to a cleaning pretreatment to achieve a purely metallic surface 9 by ion etching with argon ions. Then, for wear protection, a hard metal-carbon PVD layer 10 of type "Me-C:H" was applied. The layer thickness was about 4 μm. The polished surface finish was reproduced exactly thereby. The counter-disk was treated in the same way. Thus, with a well-purposed arrangement of phases rich in carbon atoms and phases rich in metal atoms with respectively different tribological properties, it was possible thereby to control the wear behavior and to adapt it to the environmental conditions. A layer 10 with a hardness of 1000 HK for a measuring force of 0.01 N was achieved. A high resistance to adhesive wear at higher sliding velocities could be achieved thereby even under vacuum conditions. In an experiment, no wear at all could be established.

The invention claimed is:

1. A vacuum pump (1) free of lubricant and comprising an intake opening (2), an outlet opening (3), a shaft (4) carrying a gas bearing rotor (16) supported in gas bearings (5), characterized in that at least the gas bearing surface (9) facing towards the shaft (4) and/or facing towards the gas bearing rotor (16) has a hard layer (10) having a layer thickness within a range of from 0.5 to 30 μm and made of a material having a microhardness of at least 1000 HK at a measuring force of 0.01 N.

2. The vacuum pump (1) according to claim 1, characterized by comprising gas bearing stator elements (11) designed to have inlet and outlet channels as gas supply means (12) and gas outlet openings (13).

3. The vacuum pump (1) according to claim 1, characterized in that only that part of the gas bearing stator elements (11) that directly faces towards the shaft (4) bears the hard layer (10).

4. The vacuum pump (1) according to claim 1, characterized in that the material of the hard layer (10) is selected from carbon or carbides, nitrides or carbonitrides of the metals W, Cr or Ti.

5. The vacuum pump (1) according to claim 1, characterized in that the layer thickness of the hard layer (10) varies by not more than 10% throughout the layer.

6. The vacuum pump (1) according to claim 1, characterized in that the $R_a$ roughness of the hard layer (10) is up to 500 nm, especially up to 100 nm.

7. The vacuum pump (1) according to claim 1, characterized in that the layer thickness of the hard layer (10) is within a range of from 1 to 5 μm, especially from 1 to 2.5 μm.

8. A process for the preparation of a gas bearing of a vacuum pump (1) according to claim 1 in which the hard layer (10) is applied by a coating method selected from the group consisting of PVD, CVD, electrolysis or implantation of uncharged atoms or molecules.

9. The process according to claim 8, characterized in that a plasma-supported PVD or CVD process is employed as the coating method.

10. The process according to claim 8, characterized in that the surface is etched with ions, especially with argon ions, in one process step before the coating operation.

* * * * *